(12) United States Patent
Markley et al.

(10) Patent No.: US 7,641,577 B2
(45) Date of Patent: Jan. 5, 2010

(54) MECHANICAL CHAIN TENSIONER WITH COMPLIANT BLADE SPRING

(75) Inventors: George L. Markley, Montour Falls, NY (US); John T. Crockett, II, Etna, NY (US); Timothy A. Turner, Johnson City, NY (US)

(73) Assignee: BorgWarner Inc., Auburn Hills, MI (US)

( * ) Notice: Subject to any disclaimer, the term of this patent is extended or adjusted under 35 U.S.C. 154(b) by 689 days.

(21) Appl. No.: 11/168,769

(22) Filed: Jun. 28, 2005

(65) Prior Publication Data

US 2006/0293136 A1  Dec. 28, 2006

(51) Int. Cl.
*F16H 7/08* (2006.01)
(52) U.S. Cl. .......................... 474/111; 474/109
(58) Field of Classification Search ............... 474/101, 474/109, 111, 133–138, 140
See application file for complete search history.

(56) References Cited

U.S. PATENT DOCUMENTS

| 866,702 | A | 9/1907 | Weeks ................ 118/30 |
| 1,777,527 | A | 10/1930 | Morse ................ 474/111 |
| 1,988,421 | A | 1/1935 | McCann et al. ........ 474/111 |
| 2,191,946 | A | 2/1940 | Weller |
| 2,210,276 | A | 8/1940 | Bremer ............... 474/110 |
| 2,261,316 | A | 11/1941 | Weller ............... 474/111 |
| 4,193,314 | A | 3/1980 | Horner et al. ......... 74/242.5 |
| 4,395,251 | A | 7/1983 | King et al. ........... 474/111 |
| 5,180,340 | A | 1/1993 | Vahabzadeh et al. ..... 474/111 |
| 5,266,066 | A | 11/1993 | White ................ 474/111 |
| 5,286,234 | A | 2/1994 | Young |
| 5,445,568 | A | 8/1995 | Fukuzawa et al. ....... 474/144 |
| 5,551,926 | A | 9/1996 | Ebert et al. ........... 474/101 |
| 5,797,818 | A | 8/1998 | Young ................ 474/111 |
| 5,853,341 | A | 12/1998 | Wigsten .............. 474/110 |
| 5,967,921 | A | 10/1999 | Simpson et al. ........ 474/110 |
| 5,967,922 | A | 10/1999 | Ullein et al. .......... 474/111 |
| 5,989,138 | A | 11/1999 | Capucci .............. 474/109 |
| 6,129,644 | A | 10/2000 | Inoue ................ 474/110 |
| 6,155,941 | A | 12/2000 | White et al. ........... 474/110 |
| 6,312,353 | B1 | 11/2001 | Oba .................. 474/140 |
| 6,322,469 | B1 | 11/2001 | Markley |

(Continued)

FOREIGN PATENT DOCUMENTS

EP  0055166  6/1982

(Continued)

*Primary Examiner*—Robert A Siconolfi
*Assistant Examiner*—Anna Momper
(74) *Attorney, Agent, or Firm*—Brown & Michaels, PC

(57) ABSTRACT

A tensioner for imparting tension to a chain having a body, a resilient chain guide element, at least one blade spring, and at least one bracket. The body of the tensioner has a surface with a profile of the path of a new chain and a groove found longitudinally along the length of the surface. The resilient chain guide element, on the surface of the body has a chain contact surface and two ends wrapped around the ends of the body, with the chain guide being sufficiently larger than the body, such that the chain contact surface is capable of being biased away from the body. The blade spring is present in the groove with its end in the containments means of the groove, biasing the chain guide out and away from the body.

6 Claims, 14 Drawing Sheets

U.S. PATENT DOCUMENTS

| | | | |
|---|---|---|---|
| 6,447,414 B1 | 9/2002 | White et al. | 474/110 |
| 6,478,703 B2 | 11/2002 | Suzuki | 474/101 |
| 6,524,202 B1 | 2/2003 | Tada et al. | |
| 6,554,728 B2 | 4/2003 | Young, Jr. et al. | 474/140 |
| 6,572,502 B1 | 6/2003 | Young et al. | 474/111 |
| 6,599,209 B1 | 7/2003 | Ullein et al. | 474/111 |
| 6,612,952 B1 * | 9/2003 | Simpson et al. | 474/111 |
| 6,623,391 B2 | 9/2003 | Young et al. | |
| 6,849,015 B2 | 2/2005 | Markley et al. | 474/111 |
| 6,939,259 B2 * | 9/2005 | Thomas et al. | 474/111 |
| 7,074,146 B2 * | 7/2006 | Fujikubo et al. | 474/111 |
| 2002/0061799 A1 | 5/2002 | Young | 474/111 |
| 2002/0160868 A1 * | 10/2002 | Wigsten et al. | 474/101 |
| 2002/0198073 A1 * | 12/2002 | Takeda et al. | 474/111 |
| 2005/0090345 A1 * | 4/2005 | Garcia | 474/140 |

FOREIGN PATENT DOCUMENTS

| | | |
|---|---|---|
| EP | 1096173 | 5/2001 |
| GB | 505746 | 5/1939 |
| JP | 57-134055 | 8/1982 |
| JP | 61147928 | 1/1988 |
| JP | 09081071 | 3/1998 |
| JP | 08343135 | 7/1998 |
| JP | 2000315775 | 10/2000 |
| JP | 2002120786 | 4/2002 |
| JP | 2004278621 | 10/2004 |

* cited by examiner

PRIOR ART

MECHANICAL CHAIN TENSIONER WITH COMPLIANT BLADE SPRING

REFERENCE TO RELATED APPLICATIONS

This application is related to an application filed simultaneously, entitled "PIVOTING MECHANICAL BLADE TENSIONER WITH COMPLIANT BLADE SPRING". The aforementioned application is hereby incorporated herein by reference. The application is also related to application Ser. No. 10/984,450 filed Nov. 9, 2004, entitled "COMPLIANT SNUBBER" and application Ser. No. 10/692,182 filed Nov. 9, 2004, entitled "Complaint Chain Guide With Blade Spring." The aforementioned applications are hereby incorporated by reference.

BACKGROUND OF THE INVENTION

1. Field of the Invention

The invention pertains to the field of tensioners. More particularly, the invention pertains to a mechanical tensioner with a compliant blade spring.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain when the chain is slack, and must be very rigid when the chain tightens.

To accomplish this result, a hydraulic tensioner 1, as shown in prior art FIG. 1, typically comprises a rod or cylinder as a piston 2, which is biased in the direction of the chain by a tensioner spring 3. The piston 2 is housed within a cylindrical housing 5, having an interior space which is open at the end facing the chain and closed at the other end. The interior space of the housing contains a pressure chamber 4 in connection with a reservoir or exterior source of hydraulic fluid pressure. The pressure chamber 4 is typically formed between the housing 5 and the piston 2, and it expands or contracts when the piston 2 moves within the housing 5.

Typically, valves are employed to regulate the flow of fluid into and out of the pressure chamber. For instance, an inlet check valve 6 typically includes a ball-check valve that opens to permit fluid flow in to the pressure chamber 4 when the pressure inside the chamber has decreased as a result of outward movement of the piston 2. When the pressure in the pressure chamber is high, the inlet check valve closes, preventing fluid from exiting the pressure chamber. The closing of the inlet check valve 6 prevents the piston chamber from contracting, which in turn prevents the piston from retracting, achieving a so-called "no-return" function.

Many tensioners also employ a pressure relief mechanism that allows fluid to exit the pressure chamber when the pressure in the chamber is high, thus allowing the piston to retract in response to rapid increases in chain tension. In some tensioners, the pressure relief mechanism is a spring biased check valve. The check valve opens when the pressure exceeds a certain pressure point. Some tensioners may employ a valve which performs both the inlet check function as well as the pressure relief function.

Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

A hydraulic tensioner as used with a tensioner arm or shoe is shown in Simpson et al., U.S. Pat. No. 5,967,921, incorporated herein by reference. Hydraulic chain tensioners typically have a plunger slidably fitted into a chamber and biased outward by a spring to provide tension to the chain. A lever, arm or shoe is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements of the plunger are easy in one direction (outward) but difficult in the reverse direction.

Blade tensioners are tensioners that are commonly used to control a chain or belt where load fluctuations are not so severe as to over flex the spring or springs. A ratchet with backlash is added to tensioners to limit the effective backward or untensioned travel of a tensioning device.

Prior art FIG. 2 shows an example of a blade tensioner. The conventional blade tensioner 110 includes a blade shoe 111 made of resin having a curved chain sliding face and numerous blade springs 121, preferably made of metallic material. The blade springs 121 are arranged in layers on the opposite side of the blade shoe 111 from the chain sliding face, and provide spring force to the blade shoe 111. The ends of each spring-shaped blade spring 121 are inserted in the indented portions 114 and 115, which are formed in the distal portion 112 and proximal portion 113 of the blade shoe 111, respectively.

A bracket 117 is provided for mounting the blade tensioner 110 in an engine. Holes 118 and 119 are formed in the bracket 117, and mounting bolts are inserted into these holes 118 and 119. A sliding face 116 contacts the distal portion of the blade shoe 111 and permits sliding. The slide face 116 is formed on the distal portion of the bracket 117. A pin 120 supports the proximal portion 113 of the blade shoe 111 so that it may move in either direction. The pin 120 is secured on the bracket 117.

FIG. 3 shows a chain tensioning device that has a pair of arms 202, 203 which are joined by a pivot 204. The arms 202, 203 are urged apart so that arm 203 applies tensioning force to a chain (not shown) by means of a spring 206 loaded cam block 205. To prevent collapse of arm 203 during load reversals of the chain, a catch disc 209 and rod are arranged to prevent return movement of the spring loaded cam block 205.

FIG. 4 shows an example of a tensioner that uses a ratchet device. The ratchet tensioner 301 comprises a tensioner housing 307 having a hole 312 for receiving a plunger 308 and a ratchet pawl 317 pivoted by a shaft 316 to the tensioner housing 307 and biased by a ratchet spring 318. The plunger 308 has teeth on one outer side that engage the ratchet pawl 317. The plunger 308 is biased out of the hole 312 to contact the tension lever 310 by fluid in the hollow section 313 and by the plunger spring 314. The tensioner lever 310 pivots on support shaft 309 and has a shoe surface 311 that contacts and applies tension to the slack side of the timing chain 306 wrapped around the camshaft 304 and its sprocket 305 and the crankshaft 302 and its sprocket 303. The plunger's 308 movement in and out of the hole 312 is limited by its teeth and the ratchet pawl 317 that engage them.

FIG. 5 shows a tensioning device of U.S. Pat. No. 6,599, 209. The tensioning device 421 includes a one piece supporting body 422 with interconnecting sections 424 in the shape of an open honeycomb joined to a tensioning track 423. The tensioning track 423 is elastically supported by coil spring 25. Mounting holes 420 are used to fixedly mount the tensioner 421. In alternate embodiments shown in prior art FIGS. 6a and 6b, a pair of tensioning tracks 406 are joined by rib like interconnecting sections 407 to form one piece. Interconnecting sections 407 are elastically deformable and have angled sections 408. Between the tensioner tracks 406 and the supporting body (not shown) are either a single leaf spring 409 or a leaf spring packet 409a. One of disadvantages of the tensioning device of U.S. Pat. No. 6,599,209 is the spring only tensions the center of the tensioning track and not along the entire face of the tensioner. Another disadvantage is the assembly required to place the spring within the supporting body, since the tensioner is one piece.

SUMMARY OF THE INVENTION

A tensioner for imparting tension to a chain having a body, a resilient chain guide element, at least one blade spring, and at least one bracket. The body of the tensioner has a surface with a profile of the path of a new chain and a groove found longitudinally along the length of the surface. The resilient chain guide element, on the surface of the body has a chain contact surface and two ends wrapped around the ends of the body, with the chain guide being sufficiently larger than the body, such that the chain contact surface is capable of being biased away from the body. The blade spring is present in the groove with its end in the containment means of the groove, biasing the chain guide out and away from the body. A clearance is present between the ends of the body and the ends of the resilient chain guide.

In an alternative embodiment, a first and a second tensioner are present on the slack strand and the tight strand of the chain. The spring rate of the blade spring in first tensioner may be greater than, less than or equal to the spring rate of the blade spring in the second tensioner.

In another embodiment, the clearance between the ends of the body and the ends of the resilient chain guide of the first tensioner is greater than the clearance between the ends of the body and the ends of the resilient chain guide of the second tensioner.

DETAILED DESCRIPTION OF THE INVENTION

Figure 1:
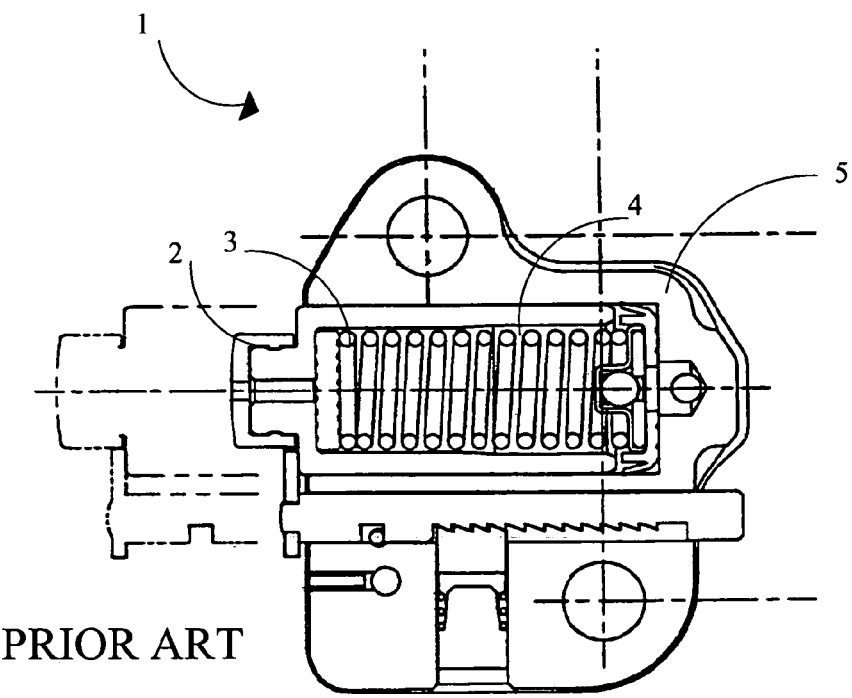
FIG. 1 shows a prior art hydraulic tensioner.
Figure 2:
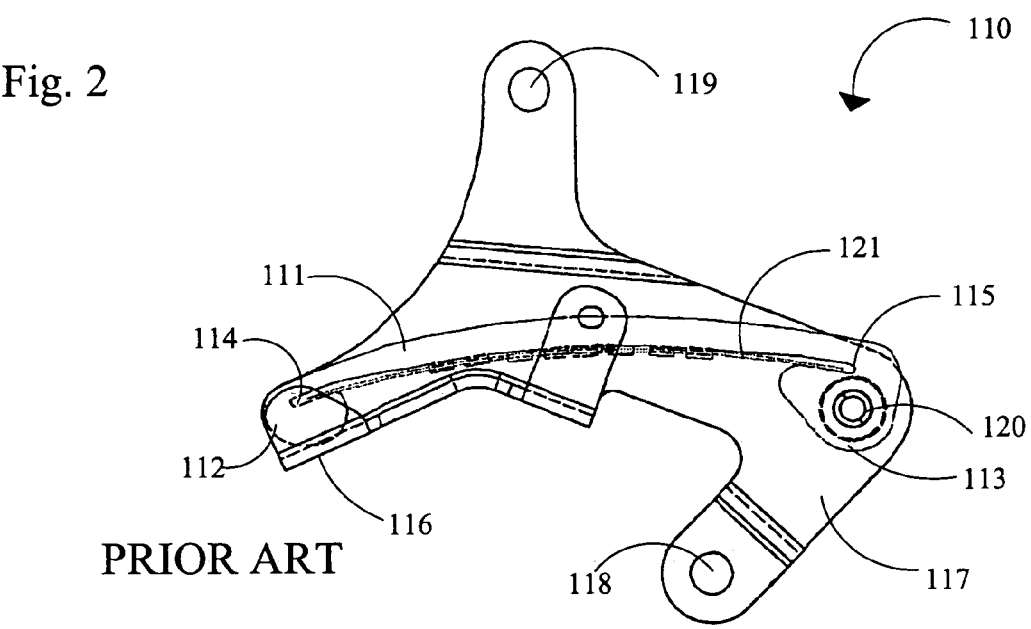
FIG. 2 shows a prior art blade tensioner.
Figure 3:
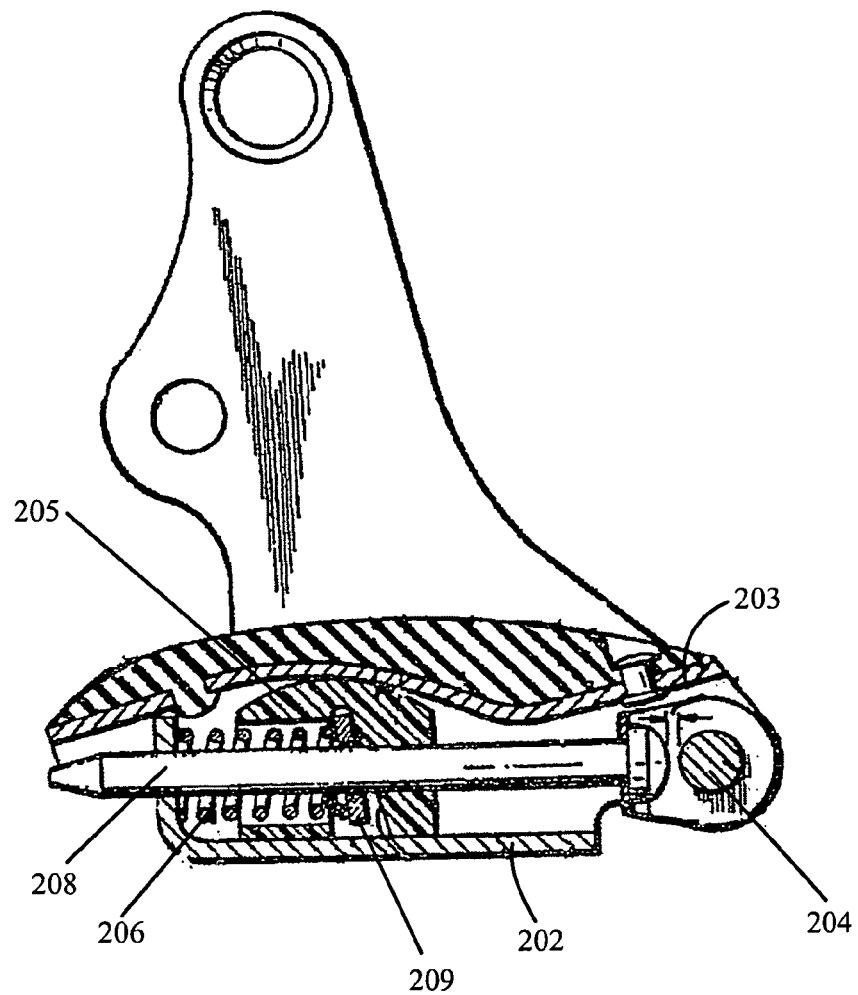
FIG. 3 shows another prior art tensioner.
Figure 4:
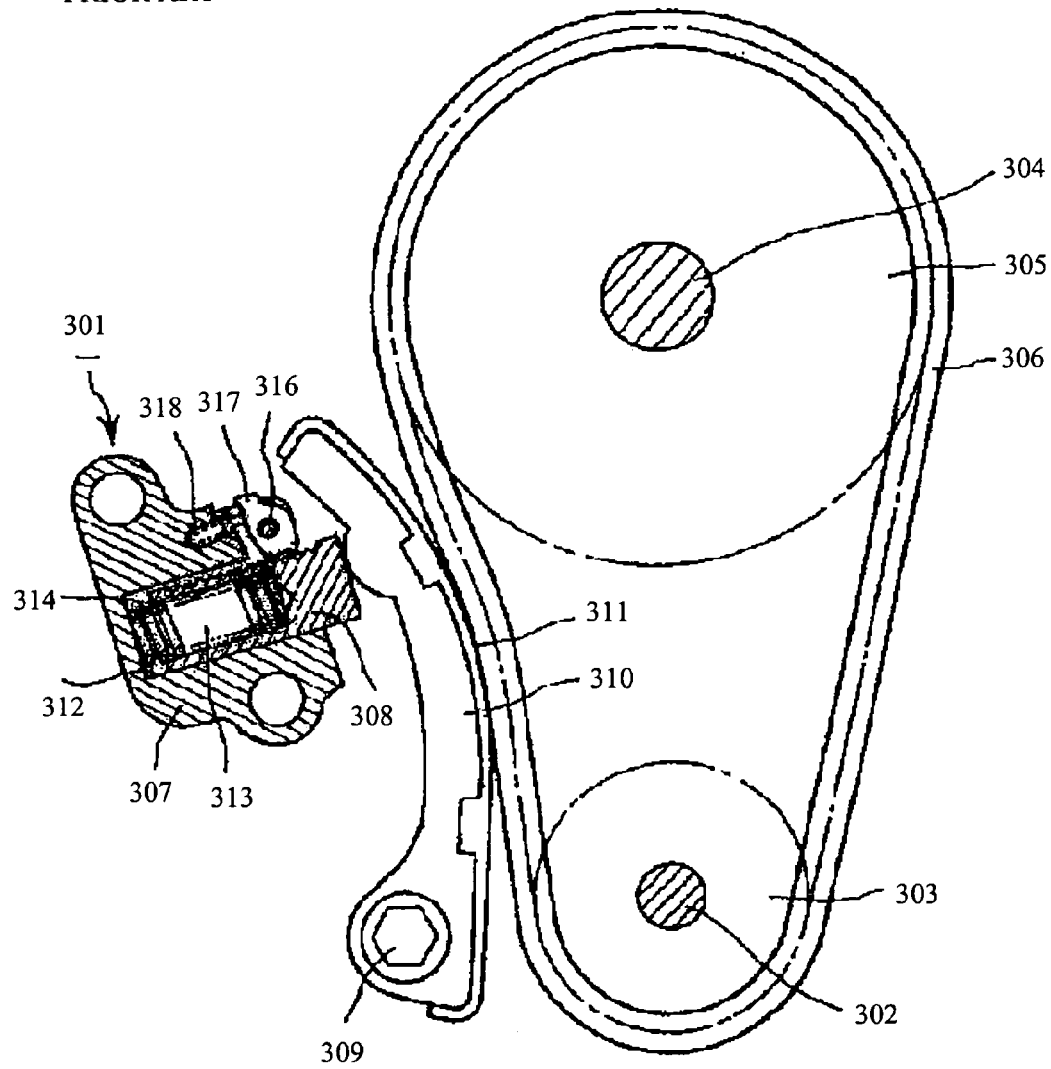
FIG. 4 shows a prior art ratcheting tensioner.
Figure 5:
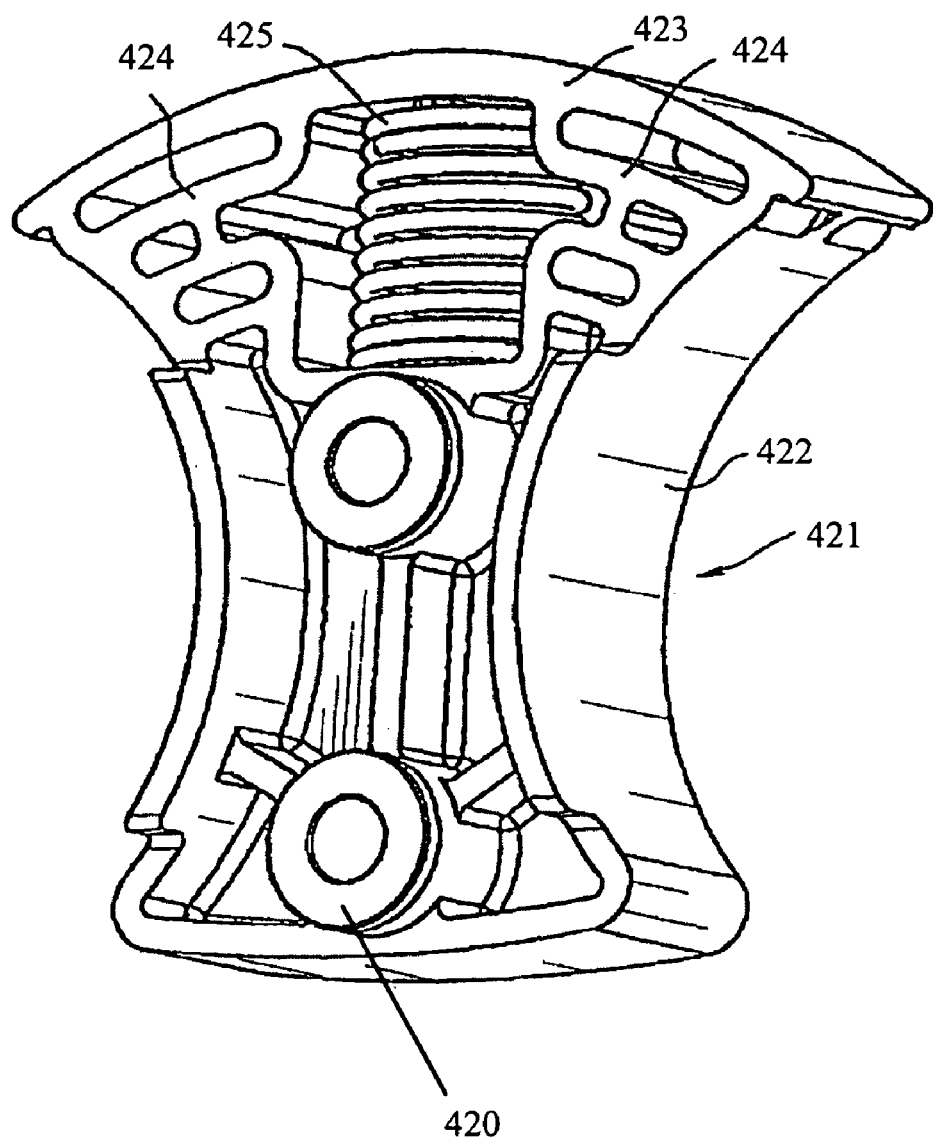
FIG. 5 shows a one piece prior art tensioner.
Figure 6A:
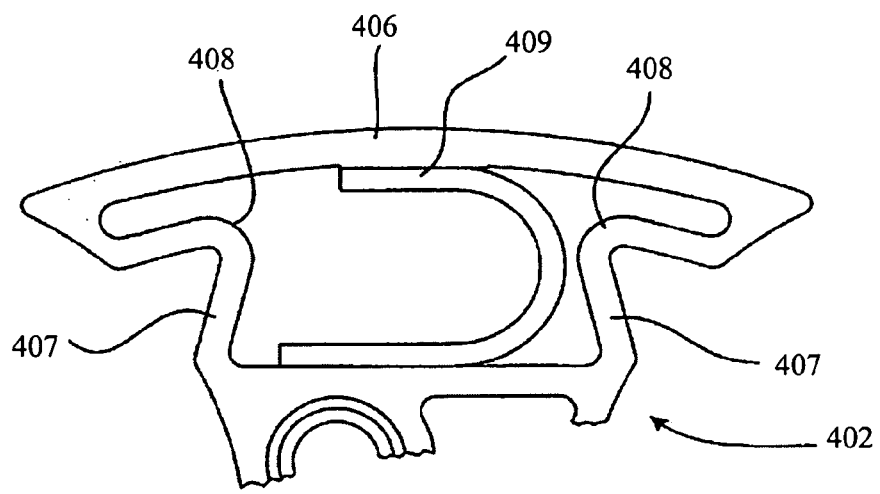
FIG. 6a shows an alternate embodiment of a one piece prior art tensioner.
Figure 6B:
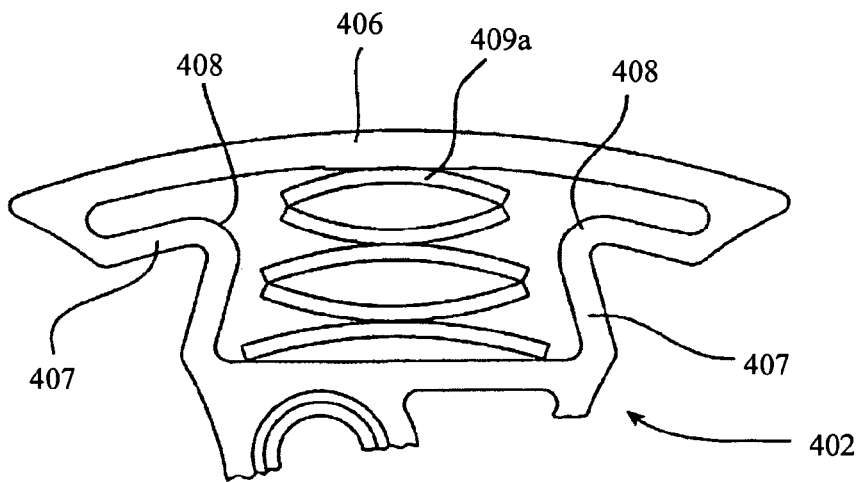
FIG. 6b shows another alternate embodiment of a one piece prior art tensioner
Figure 7:
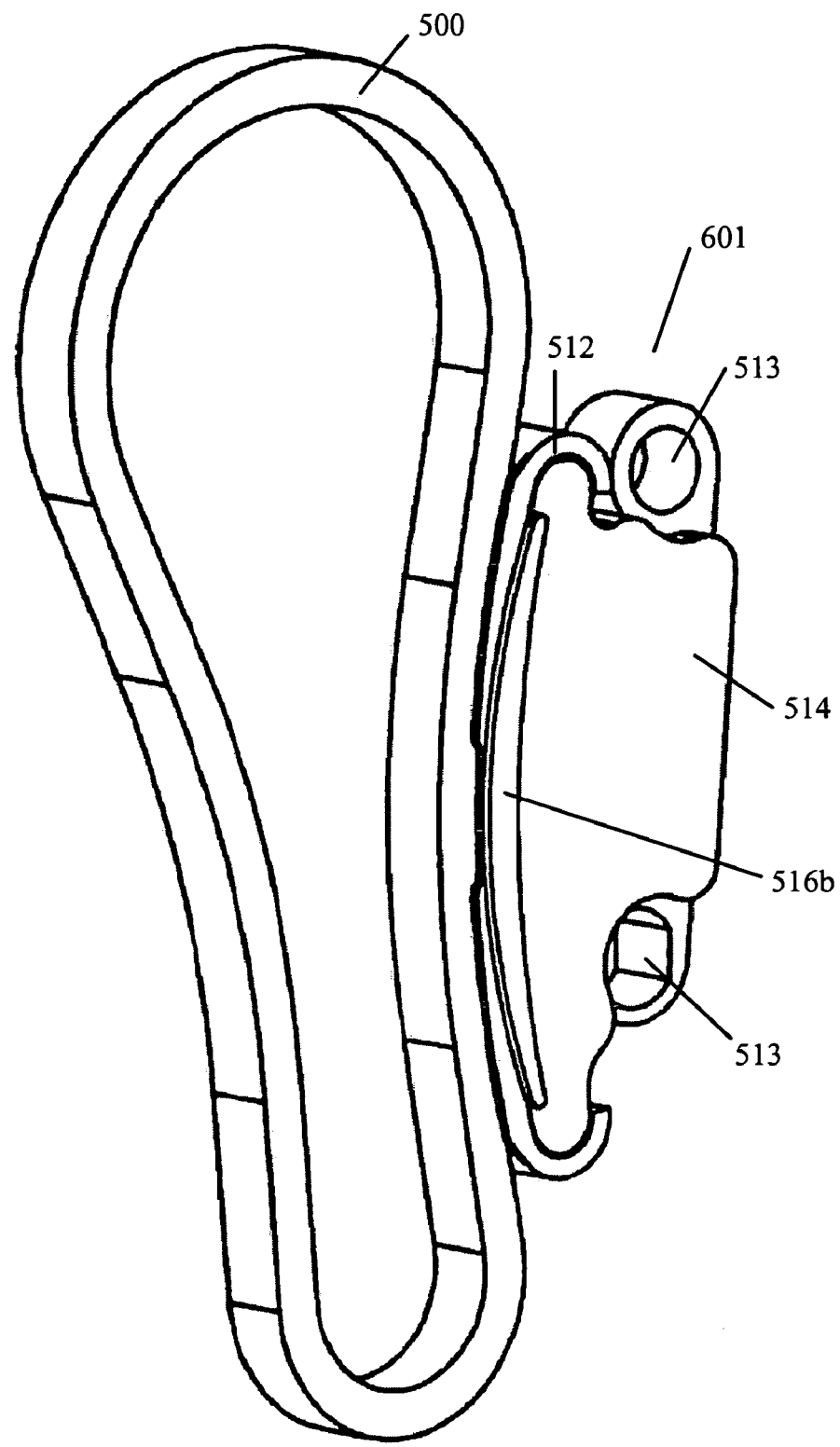
FIG. 7 shows an isometric view of a chain tensioner in a first embodiment of the present invention.
Figure 8:
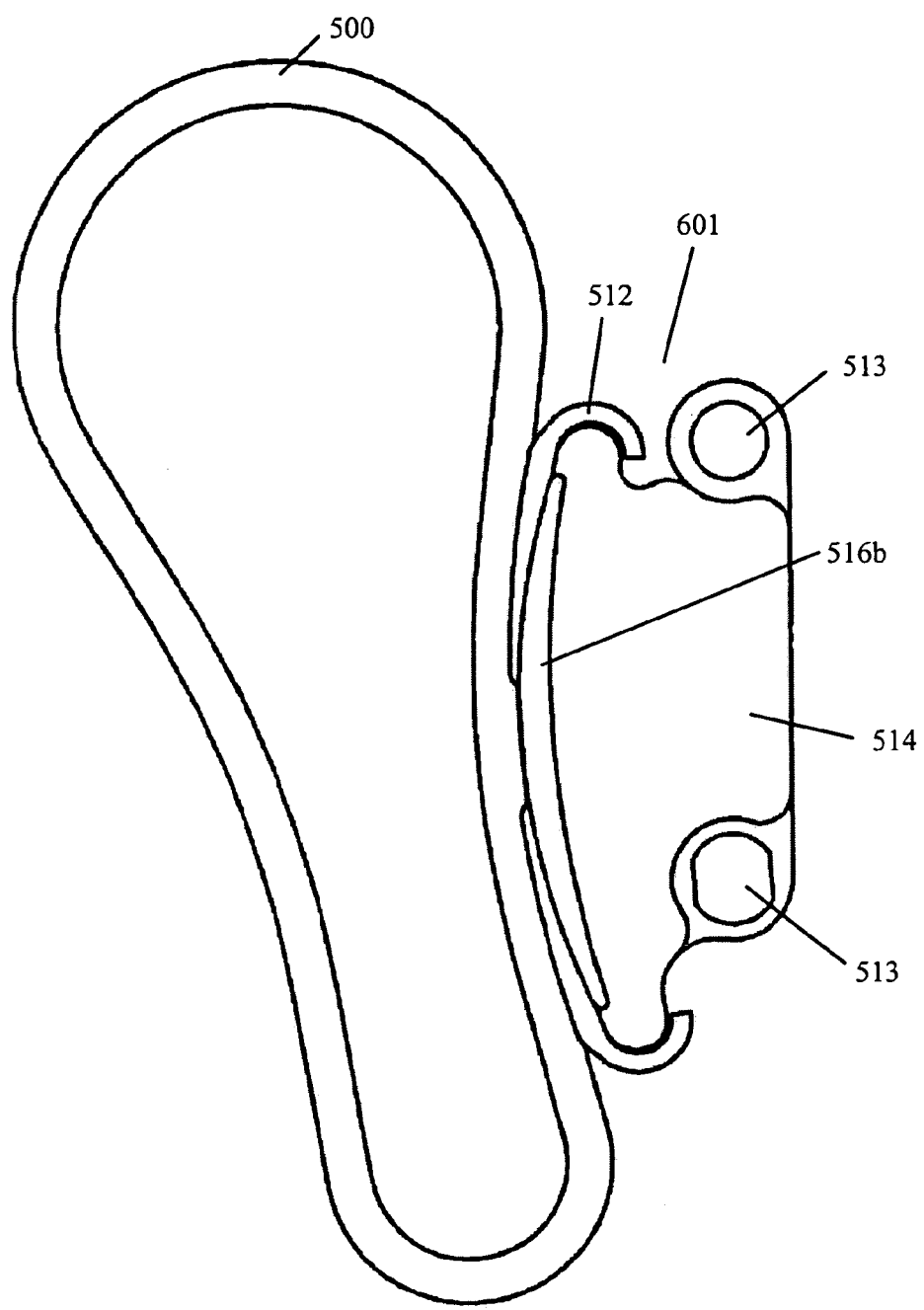
FIG. 8 shows a frontal view of the tensioner.
Figure 9:
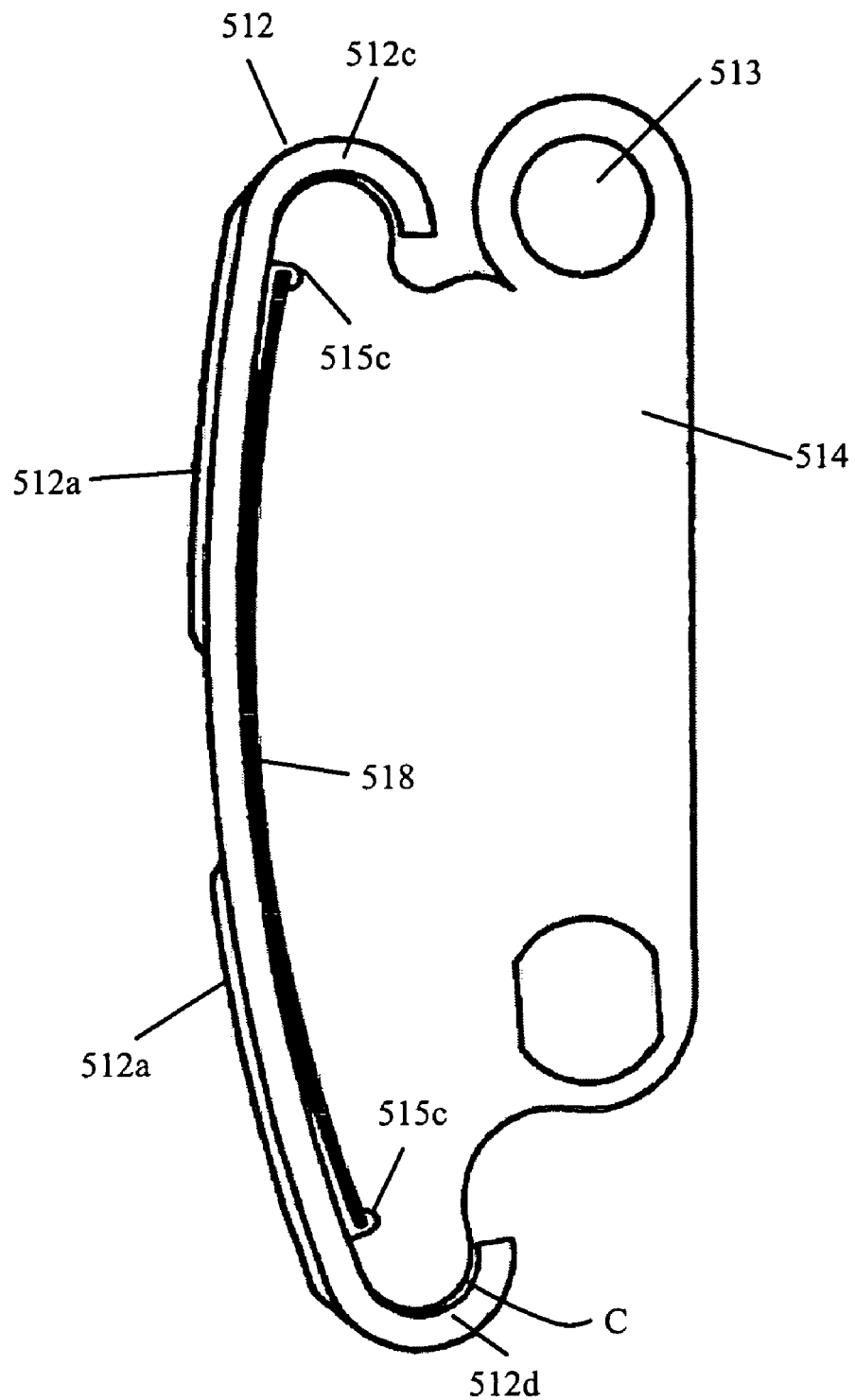
FIG. 9 shows a cut-away of the tensioner of FIG. 8 at new chain condition.

FIGS. 7 through 9 show the tensioner of a first embodiment with a new chain 500 wrapped around a drive sprocket and a driven sprocket (not shown). On the outside of the slack strand is tensioner 601.

Figure 12:
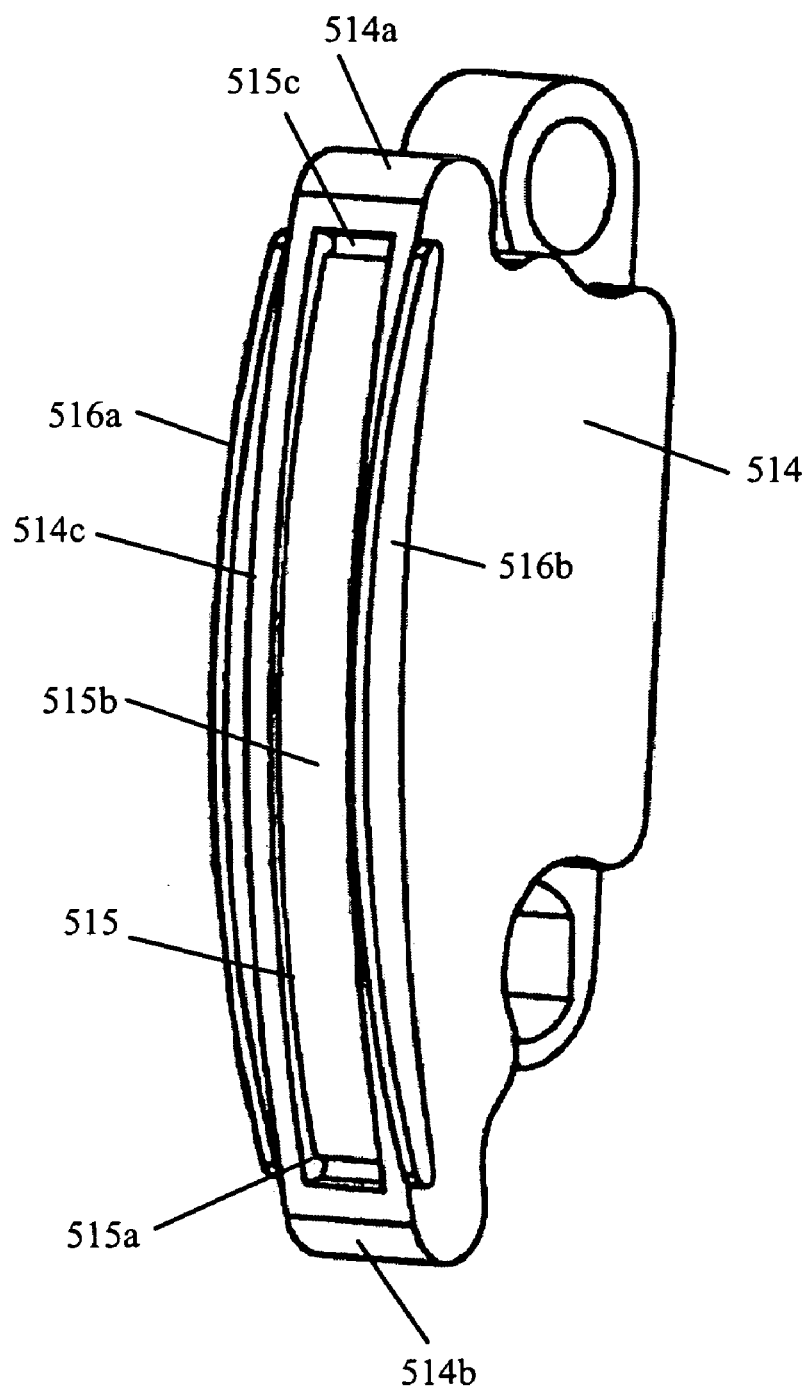
FIG. 12 shows an isometric view of the fixed bracket body.
Figure 14:
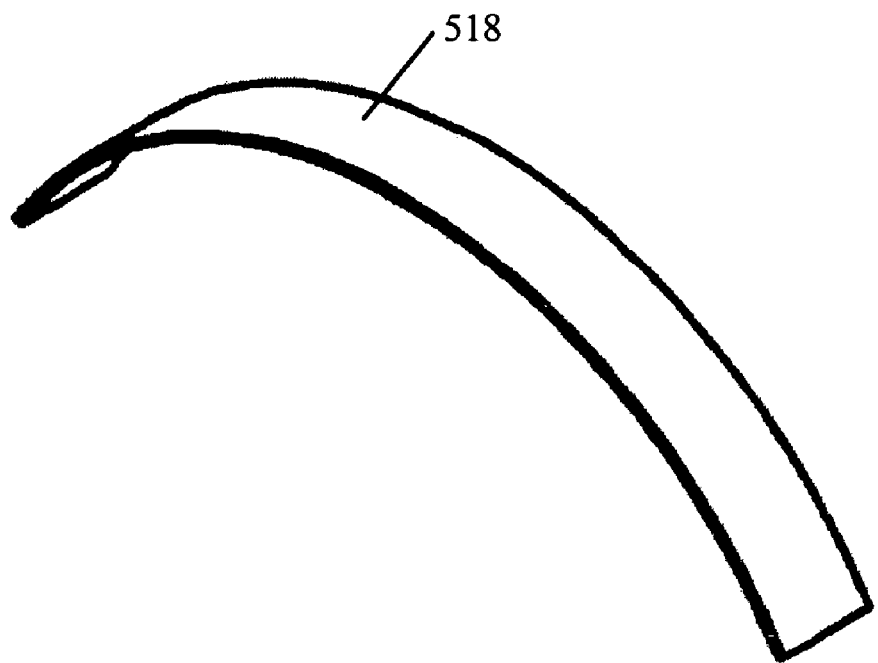
FIG. 14 shows an isometric view of the spring in its free state of a tensioner of the present invention.

Referring to FIGS. 9 and 12, a bracket body 514 has a surface 514c with a curved profile that is similar to the path of a new chain as controlled by the chain guide element 512. A channel cut groove 515 with sides 515a, a bottom 515b and recessed pockets 515c at either end of the groove 515 is found longitudinally along the length of the surface 514c. At least one blade spring 518, see FIG. 14, is somewhat flattened and placed in the channel cut groove 515. The blade spring 518 is a rectangle curled lengthwise in its free state and applied mostly uncurled in its assembled state, in the channel cut groove 515, between the bracket body 514 and the chain guide element 512. The recessed pockets 515c at either end of the groove 515 act as containment means and bearing surfaces for the blade spring ends as the blade spring 518 tries to curl into its free state. The blade spring 518 applies a separating force to the underside 512e of chain guide element 512 as the blade spring 518 tries to curl into its free state, forcing the chain guide element 512 out and away from the bracket body 514 and towards the chain 500, forcing the chain guide element 512 to constantly be in contact with the chain strand. The surface 514c of the bracket body 514 acts as a stop for the chain guide element 512 in opposition to excessive chain force. Guides 516a and 516b are present on either side of the surface 514c of the bracket body 514 to aid in maintaining the chain guide element 512 in the "Z" direction when in its extended states, such as with a worn chain. The bracket guides 516a and 516b are preferably fixedly attached to the bracket body or alternatively, integral to the bracket body 514. Holes 513 of the bracket body 514 receive bolts (not shown) for rigidly securing the bracket body 514 to the engine block or other surface.

Figure 13:
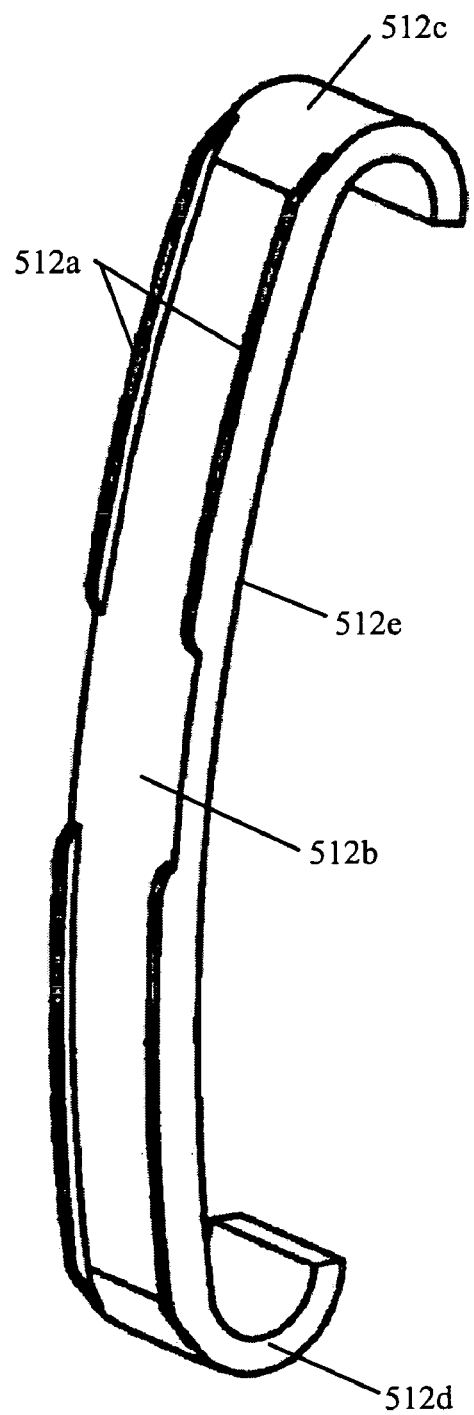
FIG. 13 shows an isometric view of the resilient chain guide element.

The chain guide element 512, as shown in FIG. 13, has a first end 512c and second end 512d joined together by a middle portion that acts as the chain sliding face 512b. The chain sliding face 512b is in sliding contact with the chain 500. Along the chain sliding face 512b of the chain guide element 512 are guides 512a on either side of the face to aid in guiding the chain 500 along the face 512b. The first end 512c and the second end 512d of the chain guide element 512 are curved underneath and around towards the center of the face. The chain guide element 512 is larger than the bracket body 514 and the curved first end 512c and second end 512d of the chain guide element 512 receive the respective first end 514a and second end 514b of the bracket body 514, loosely securing the chain guide element 512 to the bracket body 514. The chain guide element 512 is preferably made of a material that is semi-flexible at a temperature, allowing the chain guide element 512 to conform to the chain 500 and the blade spring 518. A clearance C is present between the first and second end 512c, 512d of the chain guide element 512 and the first and second end 514a, 514b of the bracket body 514. As the blade spring 518 biases the chain guide element 512 out and away from the bracket body 514, the clearance C between the ends 514a, 514b of the bracket body 514 and the ends 512c, 512d of the chain guide element 512 is taken up until the chain guide element 512 can not bow out any further.

As shown in FIGS. 7 and 8, the tensioner 601 is placed relative to the slack strand of a new chain, so that the strand is received between the pair of bracket guides 516a, 516b and slides on the chain sliding face 512b of the chain guide element 512. Since the chain guide element 512 of the tensioner 601 is semi-flexible at a temperature, the blade spring 518 force biases the chain guide element 512 away from the bracket body to tension and be in constant contact and conform with the chain strand.

FIG. 9 shows the compliant tensioning device 601 section cut and placed on the slack strand of the chain, showing the chain guide element 512 and the position of the blade spring 518 with a new chain. FIG. 14 shows a blade spring 518 in its free state with more curve than when it is installed in the channel cut groove 515 of the bracket body 514.

Figure 10:
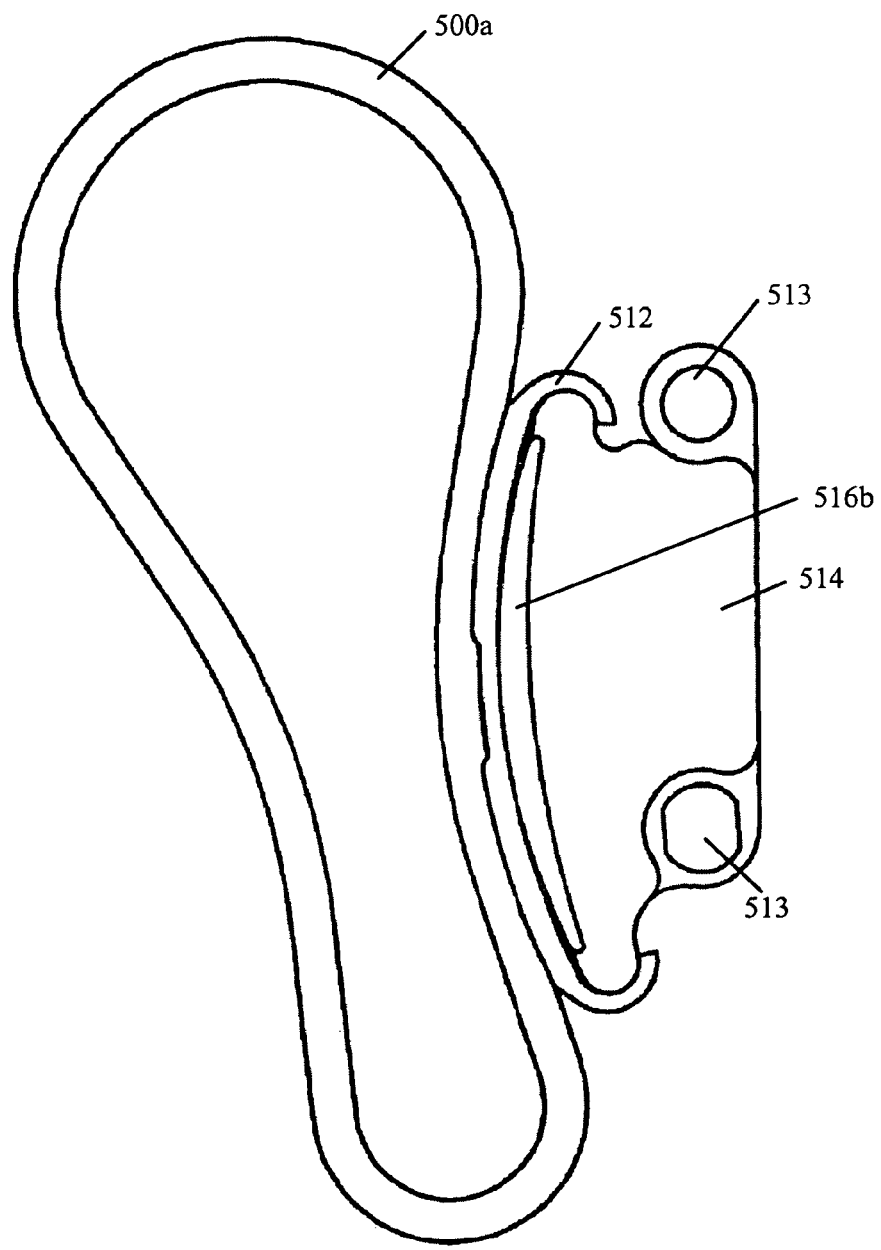
FIG. 10 shows a frontal view of the tensioner of FIG. 8 in worn chain condition.
Figure 11:
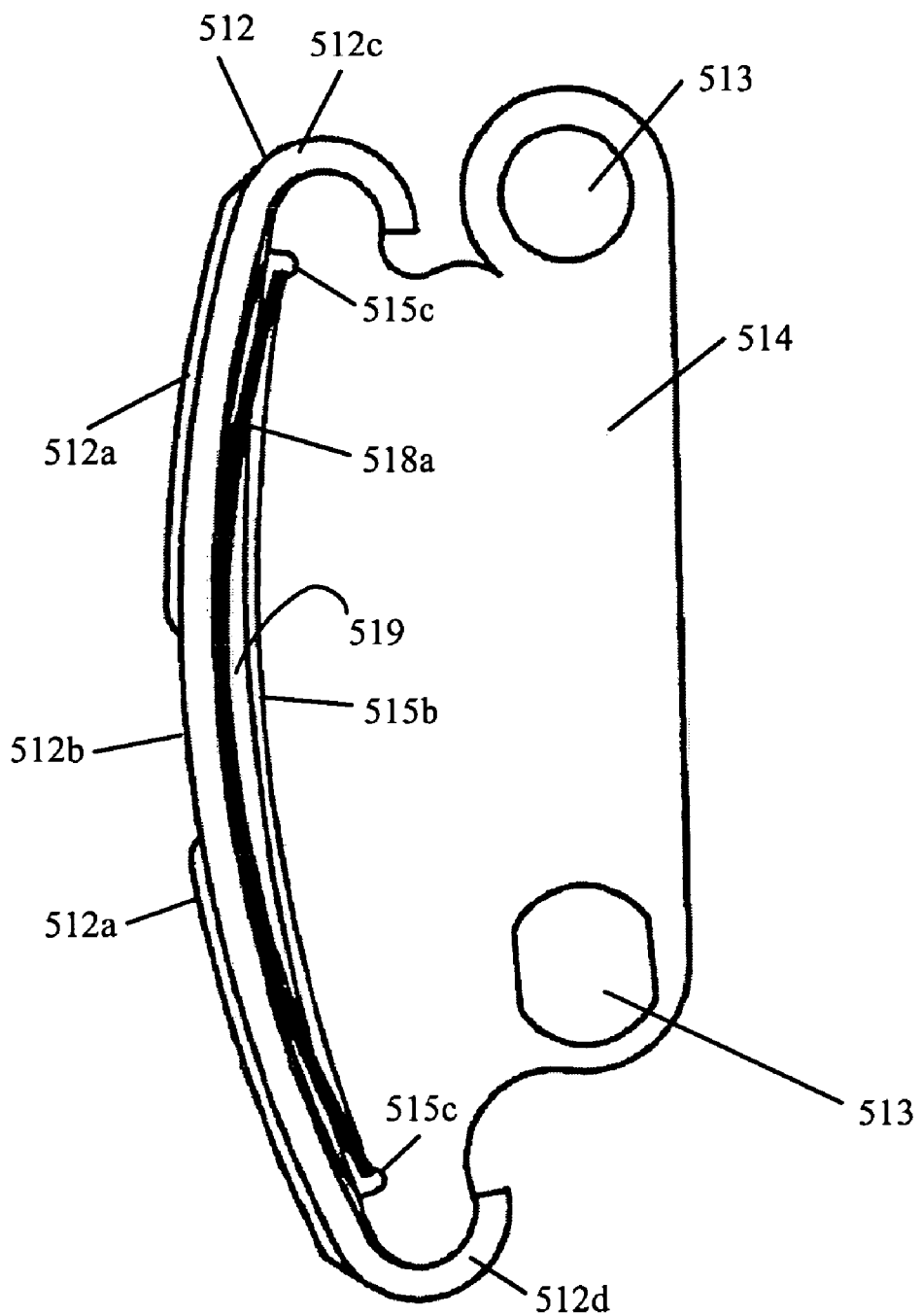
FIG. 11 shows a cut-away of the tensioner of FIG. 10.

FIG. 10 shows the tensioner 601 with a blade spring 518a placed on the slack strand of a worn chain 500a. FIG. 11 shows the section cut tensioner with a blade spring 518a. The blade spring 518a with a worn chain is more curved or bowed than a blade spring 518 with a new chain. As the chain wears and elongates, the blade spring becomes more bowed and presses against and biases the chain guide element 512 into contact with the worn chain. A gap 519 is present between the bottom 515b of the channel cut groove 515 and the blade spring 518a.

By having a strong spring load that causes the blade spring 518 to attempt to curl from its flattened state, looseness or clearance between the ends of the chain guide element 512 and the bracket body 514, the chain guide element 512 of the tensioner 601 is always in contact with chain 500, regardless of whether the chain is worn or new, ensuring chain control for the designed life of the system.

Figure 15:
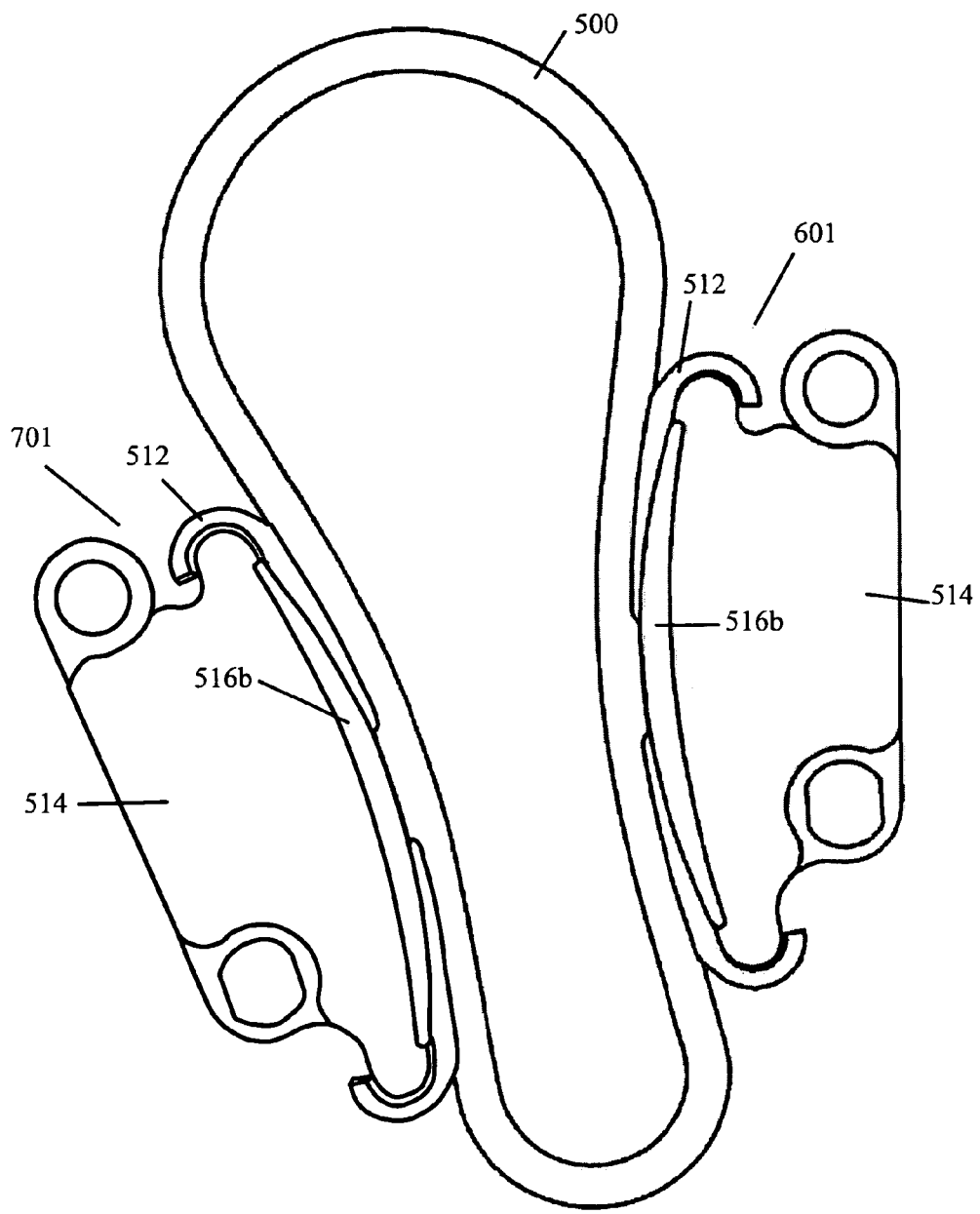
FIG. 15 shows a frontal view of a second embodiment of the present invention.

FIG. 15 shows a second embodiment of the present invention. In this embodiment, a first tensioner 601 is located on the slack strand and a second tensioner 701 is located on the tight strand of the chain 500. The first tensioner and the second tensioner are exactly the same and have the same corresponding elements as described in the first embodiment. The description is repeated below.

A bracket body 514 has a surface 514c with a gently curved profile that is similar to the path of a new chain as controlled by the chain guide element 512. A channel cut groove 515 with sides 515a, a bottom 515b and recessed pockets 515c at either end of the groove 515 is found longitudinally along the length of the surface 514c. At least one blade spring 518, see FIG. 14, is somewhat flattened and placed in the channel cut groove 515. The blade spring 518 is a rectangle curled lengthwise in its free state and applied mostly uncurled in its assembled state, in the channel cut groove 515, between the bracket body 514 and the chain guide element 512. The recessed pockets 515c at either end of the groove 515 act as containment means and bearing surfaces for the blade spring ends as the blade spring 518 tries to curl into its free state. The blade spring 518 applies a separating force to the underside 512e of chain guide element 512 as the blade spring 518 tries to curl into its free state, forcing the chain guide element 512 out and away from the bracket body 514 and towards the chain 500, forcing the chain guide element 512 to constantly be in contact with the chain strand. The surface 514c of the bracket body 514 acts as a stop for the chain guide element 512 in opposition to excessive chain force. Guides 516a and 516b are present on either side of the surface 514c of the bracket body 514 to aid in maintaining the chain strand on the chain guide element 512 in the "Z" direction when it its extended state, such as with a worn chain. The bracket guides 516a and 516b are preferably fixedly attached to the bracket body or alternatively, integral to the bracket body 514. Holes 513 of the bracket body 514 receive bolts (not shown) for rigidly securing the bracket body 514 to the engine block or other surface.

The chain guide element 512, as shown in FIG. 13, has a first end 512c and second end 512d joined together by a middle portion that acts as the chain sliding face 512b. The chain sliding face 512b is in sliding contact with the chain 500. Along the chain sliding face 512b of the chain guide element 512 are guides 512a on either side of the face to aid in guiding the chain 500 along the face 512b. The first end 512c and the second end 512d of the chain guide element 512 are curved underneath and around towards the center of the face. The chain guide element 512 is larger than the bracket body 514 and the curved first end 512c and second end 512d of the chain guide element 512 receive the respective first end 514a and second end 514b of the bracket body 514, loosely securing the chain guide element 512 to the bracket body 514. The chain guide element 512 is preferably made of a material that is semi-flexible at a temperature, allowing the chain guide element 512 to conform to the chain 500 and the blade spring 518. A clearance C is present between the first and second end 512c, 512d of the chain guide element 512 and the first and second end 514a, 514b of the bracket body 514. As the blade spring 518 biases the chain guide element 512 out and away from the bracket body 514, the clearance C between the ends 514a, 514b of the bracket body 514 and the ends 512c, 512d of the chain guide element 512 is taken up until the chain guide element 512 can not bow out any further.

Alternatively, when two tensioners 601, 701 are present, as in the second embodiment, the spring rate of the blade springs may be different. In one example, to tension the chain slack on one side (the slack side) only, the chain guide element 512 on the tight strand would normally be against the stop 514c of the bracket body 514. In the event of a load reversal due to torsionals or the reverse rotation that can occur at stopping of an internal combustion engine, the slack and tight strands are reversed and the tensioner on the tight strand would respond by tensioning the slack and preventing the bunching of the chain at the driven sprocket that contributes to tooth jumping when normal chain rotation is resumed. The possibly weaker spring on the tight strand also softens the impact when the chain again resumes its normal tight path and chain guide element 512 reseats on bracket body 514.

In another example, to tension the chain slack on both strands equally, the blade spring 518 of the tight strand is a slightly high spring rate or equal, but spring rates on both sides are increased to overcome the reversal forces of the driven sprocket and to provide off stop 514c tensioning to both strands.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for imparting tension to a chain having a slack strand and a tight strand in an engine comprising:
    a body rigidly attached to the engine with a first end and a second end and a surface having a profile of a path of a new chain and a groove longitudinally along a length of the surface, the groove having a containment means at each end;
    a resilient chain guide element on the surface of the body, having a chain contact surface, a first chain guide element end and a second chain guide element end, with the first chain guide element end wrapped around the first end of the body and the second chain guide element end wrapped around the second end of the body, the resilient chain guide element being larger than the body, such that a clearance is present between the first end of the body and the first chain guide element end and the second end of the body and the second chain guide element end; and
    at least one blade spring received within the groove of the body with ends in the containment means, pushing the resilient chain guide element out and away from the body, such that the clearance between the first end of the body and the first chain guide element end and the second end of the body and the second chain guide element end is taken up until the chain element cannot bow out any further from the body;
    wherein the at least one blade spring received within the groove of the body is a sole tensioning force of the tensioner for imparting tension to the slack strand or the tight strand of the chain.

2. The tensioner of claim 1, further comprising bracket guides fixedly attached to either side of the surface of the body.

3. A tensioning system for imparting tension to a chain having a slack strand and a tight strand in an engine comprising:
    a first tensioner on the slack strand of the chain having:
        a body rigidly attached to the engine with a first end and a second end and a surface having a profile of a path of a new chain and a groove longitudinally along a length of the surface, the groove having a containment means at each end;
        a resilient chain guide element on the surface of the body, having a chain contact surface, a first chain guide element end and a second chain guide element end, with the first chain guide element end wrapped around the first end of the body and the second chain guide element end wrapped around the second end of the body, the resilient chain guide element being larger than the body, such that a clearance is present between the first end of the body and the first chain guide element end and the second end of the body and the second chain guide element end;
        at least one blade spring received within the groove of the body with ends in the containment means, pushing the resilient chain guide element out and away from the body, such that the clearance between the first end of the body and the first chain guide element end and the second end of the body and the second chain guide element end is taken up until the chain element cannot bow out any further from the body; and
        wherein the at least one blade spring received within the groove of the body is a sole tensioning force for imparting tension to the slack strand;
    a second tensioner located on the tight strand of the chain having:
        a body rigidly attached to the engine with a first end and a second end and a surface having a profile of a path of a new chain and a groove found longitudinally along a length of the surface, the groove having a containment means at each end;
        a resilient chain guide element on the surface of the body, having a chain contact surface, a first chain guide element end and a second chain guide element end, with the first chain guide element end wrapped around the first end of the body and the second chain guide element end wrapped around the second end of the body, the resilient chain guide element being larger than then the body such that a clearance is present between the first end of the body and the first chain guide element end and the second end of the body and the second chain guide element end; and
        at least one blade spring received within the groove of the body with ends in the containment means, such that the clearance between the first end of the body and the first chain guide element end and the second end of the body and the second chain guide element end is taken up by the at least one blade spring pushing the resilient chain guide element out and away from the body until the chain guide element cannot bow out any further from the body;
        wherein the at least one blade spring received within the groove of the body is a sole tensioning force for imparting tension to the tight strand.

4. The tensioning system of claim 3, wherein the at least one blade spring of the first tensioner has a different spring rate then the at least one blade spring of the second tensioner.

5. The tensioning system of claim 3 wherein the first clearance is larger than the second clearance.

6. The tensioning system of claim 3, further comprising bracket guides fixedly attached to either side of the surface of the body.

* * * * *

UNITED STATES PATENT AND TRADEMARK OFFICE
CERTIFICATE OF CORRECTION

PATENT NO.        : 7,641,577 B2
APPLICATION NO.   : 11/168769
DATED             : January 5, 2010
INVENTOR(S)       : Markley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Sixteenth Day of November, 2010

David J. Kappos
*Director of the United States Patent and Trademark Office*